United States Patent
Mauro et al.

(10) Patent No.: US 8,328,499 B2
(45) Date of Patent: Dec. 11, 2012

(54) ROAD WITH INLAYED WIND HARNESSING TECHNOLOGY

(75) Inventors: Giovanni Mauro, Washington Township, MI (US); Usama Alkaragholy, Dearborn, MI (US)

(73) Assignee: G.U. Green Group, LLC, Shelby Township, MI (US)

( * ) Notice: Subject to any disclaimer, the term of this patent is extended or adjusted under 35 U.S.C. 154(b) by 0 days.

(21) Appl. No.: 13/225,288

(22) Filed: Sep. 2, 2011

(65) Prior Publication Data
US 2012/0045314 A1 Feb. 23, 2012

Related U.S. Application Data

(60) Provisional application No. 61/379,457, filed on Sep. 2, 2010.

(51) Int. Cl.
*F03B 13/00* (2006.01)
(52) U.S. Cl. .............. 415/1; 415/183; 415/4.1; 290/1 R; 290/44; 290/55
(58) Field of Classification Search .................. 415/4.1, 415/183; 290/1 R, 44, 55
See application file for complete search history.

(56) References Cited

U.S. PATENT DOCUMENTS

| | | | | |
|---|---|---|---|---|
| 4,321,476 A * | 3/1982 | Buels | .............................. | 290/55 |
| 4,437,015 A * | 3/1984 | Rosenblum | ................... | 290/1 R |
| 5,272,378 A * | 12/1993 | Wither | .......................... | 290/1 R |
| 6,409,467 B1 * | 6/2002 | Gutterman | ..................... | 415/4.3 |
| 7,098,553 B2 * | 8/2006 | Wiegel et al. | .................... | 290/55 |
| 7,193,332 B2 * | 3/2007 | Spinelli | ......................... | 290/1 R |
| 7,427,173 B2 * | 9/2008 | Chen | .............................. | 404/71 |
| 7,495,351 B2 * | 2/2009 | Fein et al. | ....................... | 290/1 R |
| 7,525,210 B2 * | 4/2009 | Fein et al. | ........................ | 290/44 |
| 7,800,036 B2 * | 9/2010 | Fein et al. | ................. | 250/203.4 |
| 2010/0327602 A1 * | 12/2010 | Jordan | .......................... | 290/1 R |

* cited by examiner

*Primary Examiner* — Igor Kershteyn

(57) ABSTRACT

A method and apparatus is provided for harnessing the wind energy generated by vehicles passing on a roadway. A roadway is provided with a trench extending from a surface of the roadway. The trench may be provided along an extended stretch of the roadway or as a discrete trench section spaced apart along the roadway. The trench or trench section may be provided near the middle of a lane making up the roadway such that a vehicle travelling on the roadway passes over the trench. In this manner the wind displaced by the passing vehicle is directed into the trench and experienced by a wind turbine or wind generator provided within the trench. The trench is covered by a structure configured to direct the displaced wind inside the trench. The wind turbine converts the kinetic energy of the wind into mechanical energy that is then converted into useable power.

20 Claims, 15 Drawing Sheets

ROAD WITH INLAYED WIND HARNESSING TECHNOLOGY

RELATED APPLICATIONS

This application claims the benefit of U.S. Provisional Patent Application Ser. No. 61/379,457, filed on Sep. 2, 2010, which is hereby incorporated in its entirety.

FIELD OF THE INVENTION

The present application relates to methods and systems for harnessing wind energy generated by vehicles passing over a roadway surface for conversion into useable electricity.

BACKGROUND OF THE INVENTION

According to some studies, the average global temperature has increased 1.4 degrees Fahrenheit since the 1800's. At the current trajectory of global warming, some of these studies predict that the average global temperature may increase by anywhere from 2.5 to 10.4 degrees Fahrenheit by the year 2100. Much of the global warming phenomenon has been accredited to an imbalance caused by a continual increase in greenhouse gas emissions and a decrease in forestation, which is capable of offsetting such increased emissions. Some greenhouse gasses are predominately emitted through the production and burning of fossil fuels, such as coal, oil and natural gas to meet various energy demands. As the population of the planet continues to grow and many nations become more industrialized, the increased energy demands will create an even greater imbalance likely resulting in a precipitous rise in global temperatures. Very simplistically, one solution to halt the rise in global warming involves a reduction of greenhouse gas emissions, much of which are a by-product of processes utilized to meet today's energy needs.

Many suggestions have been proposed for the development of clean renewable energy to combat global warming by reducing or eliminating greenhouse gas emissions without depleting valuable nonrenewable resources. Some suggestions have explored the use of renewable resources such as biofuels, biomass, geothermal energy, hydroelectricity, solar energy, wave energy and wind energy, each with its own advantages.

The harnessing of wind energy has been shown to be practical in generating power and electricity and is constantly gaining more widespread use throughout the world and in particular in the United States. In 2010, wind energy accounted for approximately 2.3 percent of the electricity generated in the United States, amounting to almost 95,000 megawatt-hours of electricity. This is electricity that would have otherwise likely been generated by burning fossil fuels. Thus, carbon dioxide emissions, one of the most abundant greenhouse gasses, were reduced by approximately 64 million tons. The U.S. Department of Energy has established a goal for the year 2030 to generate 20 percent of the electricity in the U.S. from wind energy. Much of the power from wind energy in the U.S. is currently generated by massive wind turbines clustered on farms throughout the rural U.S. and to a lesser extent offshore. While the wind turbines have proven to be relatively effective, they are quite costly to build and maintain. In order to reach the goal of 20 percent power generation from harnessed wind energy, hundreds of thousands of new wind turbines will need to be put into effect. However, the cost of such a project using today's technology is staggering and may be unattainable. Thus, in order to reach the goal of 20 percent power generation from wind energy, additional methods need to be realized.

Some methods that are being explored propose to capture the wind energy produced by vehicles travelling on a roadway. In several known versions of this method, the wind energy produced by passing vehicles is harnessed via wind turbines provided above ground alongside a roadway, in a median structure between the lanes of a roadway, or on the sides and top of a tunnel, for example. These techniques are demonstrated in U.S. Pat. Nos. 7,525,210, and 7,098,553 and U.S. Patent Application Publication No. 2007/0059097. These known techniques, however, are disadvantageous because they clutter the roadways with unsightly wind turbines, they restrict or constrain views, and they limit other uses of the area surrounding the roadways. Moreover, by their very nature, the wind turbines in these methods must be provided a considerable distance away from the passing vehicles generating the wind energy and thus are inefficient. The wind turbines in the above methods experience less wind than that generated by the passing vehicles, and thus do not achieve optimum performance. Additionally, the little wind that is experienced by the wind turbines in the above methods is not directionally uniform and is difficult to effectively capture, requiring the use of wind turbines that are more complex.

Accordingly, there is a need in the art to provide efficient wind harnessing systems and methods for harnessing the wind energy produced by vehicles passing over a roadway surface without the disadvantages described above.

SUMMARY OF THE INVENTION

Exemplary embodiments of the present invention address at least the above problems and/or disadvantages and provide at least the advantages described below.

An aspect of exemplary embodiments of the present invention is to provide a wind energy harnessing system, such system comprising a surface passable by a vehicle, said surface including an open area extending below the surface, wherein said open area forms a cavity. A grate is positioned over said open area and provided substantially flush with said surface. A wind energy harnessing apparatus is also positioned within said cavity to capture wind generated by a vehicle or vehicles passing overhead.

According to another aspect of the exemplary embodiments, a method is provided for forming a wind energy harnessing system, said method comprises constructing a surface of a roadway with an open cavity extending from said surface. A wind energy harnessing apparatus is then positioned inside said cavity and a grate secured over said cavity to be substantially flush with said surface of the roadway.

In accordance with another aspect of the exemplary embodiments, a method is provided for harnessing wind energy. Said method comprises providing a roadway suitable for vehicular traffic, such that the roadway includes an open area defining a cavity extending below a surface of the roadway. The open area is secured by a grate provided substantially flush with said surface. The grate enables wind energy generated by a vehicle passing on said roadway to be directed into said cavity. The generated wind energy is then harnessed via a wind energy harnessing apparatus positioned within the cavity. The harnessed wind energy is then converted into usable power.

The objects, advantages and salient features of the invention will become apparent to those skilled in the art from the following detailed description, which, taken in conjunction with annexed drawings, discloses exemplary embodiments of the invention.

BRIEF DESCRIPTION OF THE DRAWINGS

The above and other exemplary features and advantages of certain exemplary embodiments of the present invention will become more apparent from the following description of certain exemplary embodiments thereof when taken in conjunction with the accompanying drawings in which.

Throughout the drawings, like reference numerals will be understood to refer to like elements, features and structures.

DETAILED DESCRIPTION OF EXEMPLARY EMBODIMENTS

Figure 1:
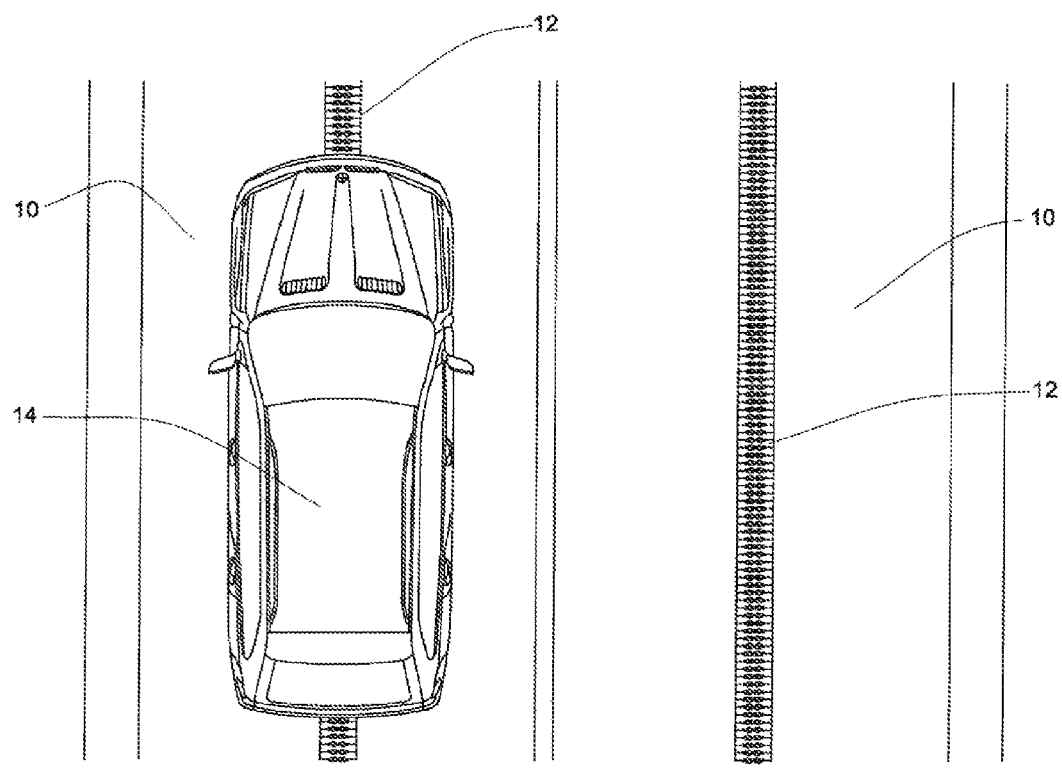
FIGS. 1, 2 and 3 illustrate roadways according to exemplary embodiments of the present invention.

The matters exemplified in this description are provided to assist in a comprehensive understanding of exemplary embodiments of the present application disclosed with reference to the accompanying figures. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Field tests using a wind anemometer have been conducted to measure the wind speed of air displaced by vehicles passing at various speeds. The tests have measured that a vehicle travelling at 20 miles per hour (mph) can produce wind at a speed of 2 mph and a vehicle travelling at 65 mph can produce wind up to a speed of 45 mph. Various conditions present during testing could alter the test results, such as the ambient wind present at the time of the test, the shape and size of the vehicle displacing the air as well as the accuracy of the anemometer. Some models indicate that wind speeds in excess of 45 mph can also be generated by certain vehicles passing at a safe speed. Nevertheless, an average of 45 mph wind generated by each passing vehicle over many miles of high speed roadways is capable of producing an extravagant amount of energy that can be harnessed and converted to electricity for powering any energy consuming device, such as a traffic light, street lamp, lighted road sign or any other powered road equipment, for example.

Many windmills, wind turbines, wind generators or other wind energy harnessing technologies provided on suitably located wind farms do not typically experience average wind speeds near 45 mph. In fact, average wind speeds of 12 mph are typically regarded as economically suitable for generating electricity using known wind turbines. Thus, such high speed wind produced by passing vehicles provides an untapped opportunity to generate useful power from the harnessed wind that cannot be consistently captured in other environments utilizing conventional wind energy harnessing technologies.

The air displaced by moving vehicles has the greatest kinetic energy at the location of the displaced wind. The generated wind then dissipates as it travels farther from the location of displacement. Thus, the highest wind speeds have been measured in the vicinity closest to a passing vehicle or vehicles. Known methods for harnessing the wind energy generated by passing vehicles, however, are unable to capture the increased kinetic energy of the wind experienced in the close proximity of a passing vehicle. The proposed embodiments detailed below provide efficient systems and methods that are capable of harnessing the increased kinetic energy of the greater wind speeds produced in the area of a passing vehicle to generate immense amounts of electric power for unlimited uses.

Along roadways that produce excess amounts of power, the generated electricity could be stored and/or distributed to a standalone or conventional power grid to be distributed or consumed in any useful or known manner. While advantageous, the below embodiments are not limited to high traffic or high speed roadways that are capable of generating immense amounts of energy. The below embodiments may be realized in any suitable environment based on the use or purpose of the roadway and the demand for power. For example, one or more of the exemplary embodiments may be utilized near an entrance to a neighborhood or near a shopping center where frequent traffic is expected. Additionally, the exemplary embodiments discussed in detail below are not limited to roadways for automobiles, and can be provided in a similar manner in relation to any surface that experiences displaced wind energy such as, but not limited to, a track or rail deployed for transport trains, high speed commuter trains, public transportation and other like systems.

Figure 2:
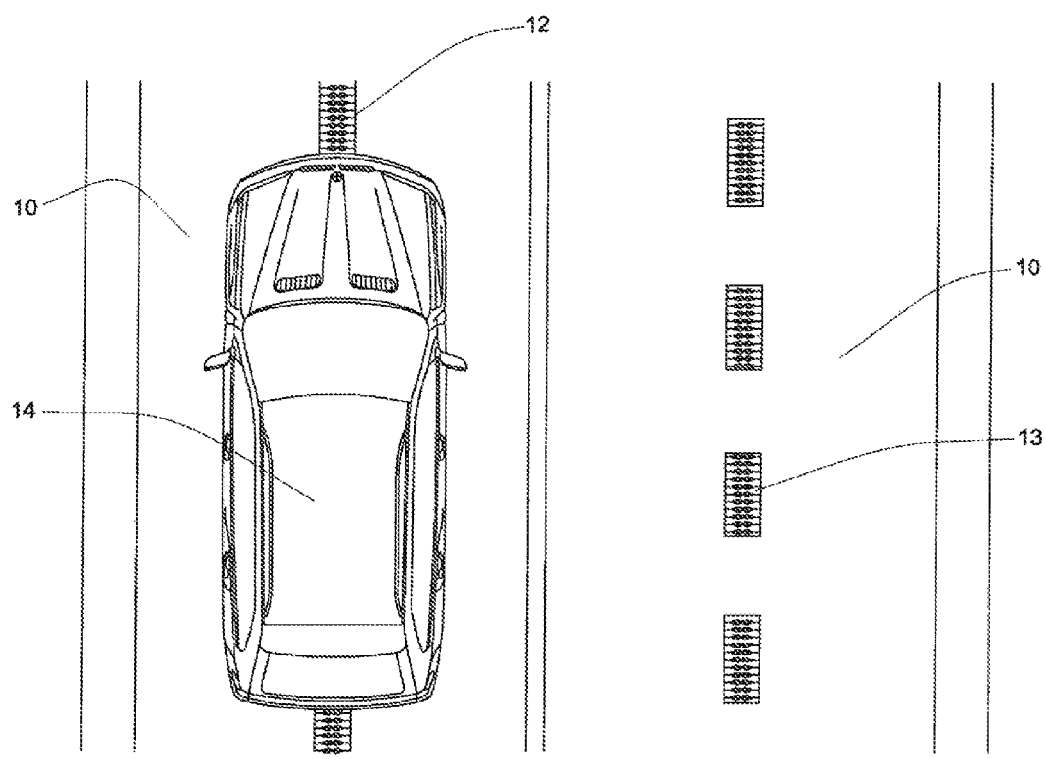
Figure 3:
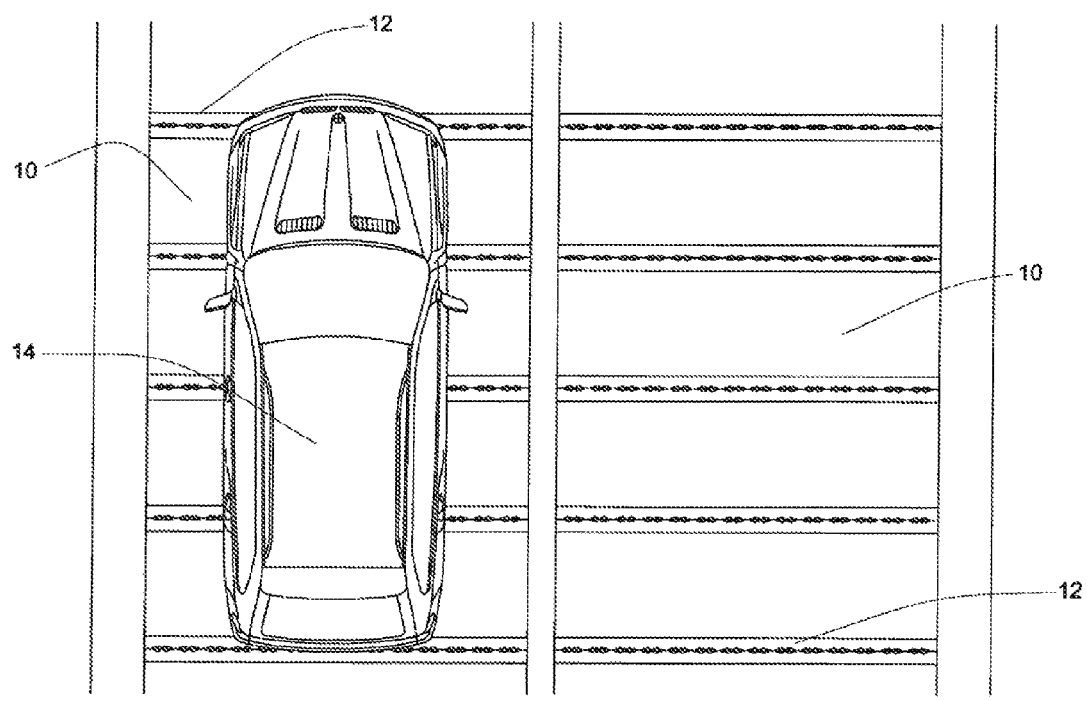

As shown in FIGS. 1, 2, and 3, a roadway 10 of the exemplary embodiments includes a recess or trench 12 extending from a surface of the roadway 10. The trench 12 may be provided along an extended stretch of the roadway 10 as shown in FIG. 1 or as a discrete trench section or sections 13 spaced apart by a desirable distance, as shown in FIG. 2. While trench 12 and trench section 13 are shown as rectangular or elongate in shape, trench 12 or trench section 13 may be any geometric shape such as circular or trapezoidal, as deemed suitable according to the specific embodiment. The trench 12 or trench section 13 is preferably provided near the middle of a passable lane making up the roadway 10 such that a vehicle 14 travelling on the roadway straddles or passes directly over the trench 12, 13 so that wind displaced by the passing vehicle is directed into the trench 12, 13 and experienced by a wind turbine or wind generator 16 provided in the trench. In some embodiments, the trench 12 or trench section 13 may be placed offset from the middle of the passable lane or even near the edge, shoulder or curb 28 of a passable lane. In still other embodiments, a plurality of trenches 12 or trench sections 13 may be provided side-by-side or parallel to each other in a single passable lane of the roadway. Further, as shown in FIG. 3, a trench or a plurality of trenches 12 may extend across at least a part of the roadway surface 10 perpendicular to the flow of traffic across the roadway 10. In still other embodiments, it is contemplated that a trench 12 may span diagonally or in any configuration along the roadway 10.

Figure 4:
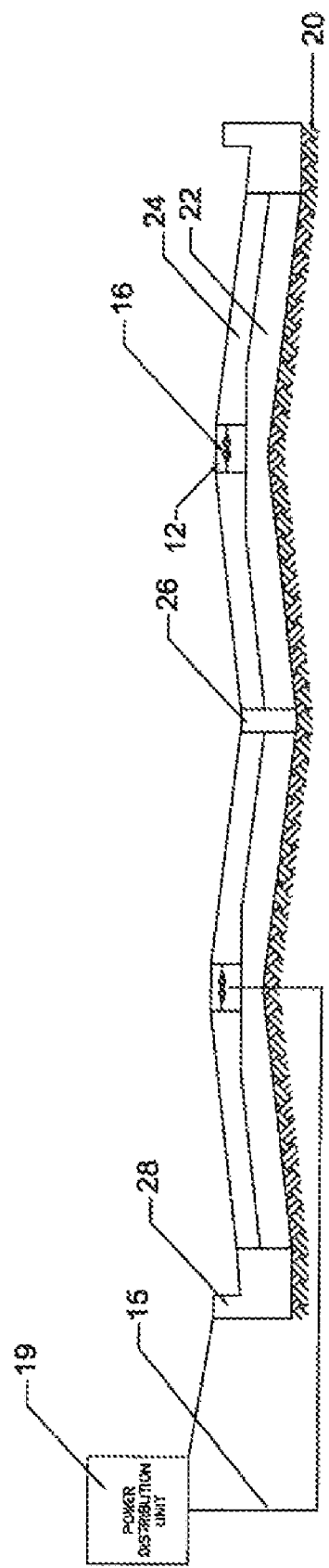
FIG. 4 illustrates a cross-section of a roadway according to an exemplary embodiment of the present invention.

The trench 12 and trench section 13 include a sufficient depth and width to house one or more appropriate wind harnessing apparatuses, such as a wind turbine or wind generator 16, as shown in FIG. 4, and any other necessary components for generating and harvesting electric power from the displaced wind energy captured by the wind turbine 16. Wind turbine or wind generator 16 provided in trench 12 or trench section 13 is configured to generate electricity from the kinetic energy of the wind experienced by the wind turbine or wind generator 16, as is commonly performed in the art. The electric power generated from the harnessed wind energy of passing vehicles is preferably transferred via a transmission medium 15 to a power distribution unit 19 for storing and distributing the generated power. Alternatively, the generated power may be transmitted directly to an energy consuming device (not shown). In another embodiment, some of the generated electricity may transmitted back to the wind generator 16, as discussed further below. While the number of applications for the generated power is limitless, the exemplary embodiments are particularly suitable for powering traffic lights, speed or surveillance cameras, street lamps, lighted road signs or any road equipment requiring power.

Roadway 10 of the exemplary embodiments is constructed according to any known manner in accordance with modern roadway construction, as well as any manner implemented in the future, and includes a trench or recess 12,13 built into the road for housing at least one apparatus capable of generating useful power from harnessed wind energy produced by a passing vehicle, such as a wind turbine 16. Roadway 10 is constructed in accordance with industry standards and techniques suitable for the planned use of the roadway in consideration of environmental impacts. For example, roadway 10 is preferably constructed in a manner using suitable materials in consideration of a planned frequency of use of the roadway, the impact of use on the roadway, the regional climate, and any local, state or federal regulations. The design of roadway 10 and the chosen materials for constructing the roadway should be determined such that the roadway is minimally impacted by the known effects of snow, ice, debris, dust, oil, grease, rainwater, salt, sub-freezing conditions, rust, high speeds and high weight such that the roadway is safe for its intended purpose. The implementation of specific variations of aggregate, concrete mixes, roadway depths and layers, roadway surface layoff materials and roadway surface grading are not critical to the exemplary embodiments except that the roadway shall be constructed according to its desired use and with suitable strength, durability and safety as that of a conventional roadway. The roadway 10 of the exemplary embodiments may be formed either as a single lane roadway or multi-lane roadway as desired, with one or more trenches 12 or trench sections 13 provided in one or more of the lanes.

In known prior art, trenches have been used in roadway environments for drainage purposes. Known trench drain systems have been implemented along the sides of roadways for draining any runoff away from the road. The exemplary embodiments of the present invention employ similar techniques as those utilized in the prior art systems for the general construction of the trench in the roadway. For example, U.S. Pat. No. 7,967,523, which is hereby incorporated in its entirety, describes one such known system for manufacturing and installing a trench drain in a roadway that may similarly be utilized in the exemplary embodiments. As described in further detail below, the exemplary embodiments employ similar techniques for constructing a trench 12,13 for primarily housing wind harnessing technology.

Figure 5:
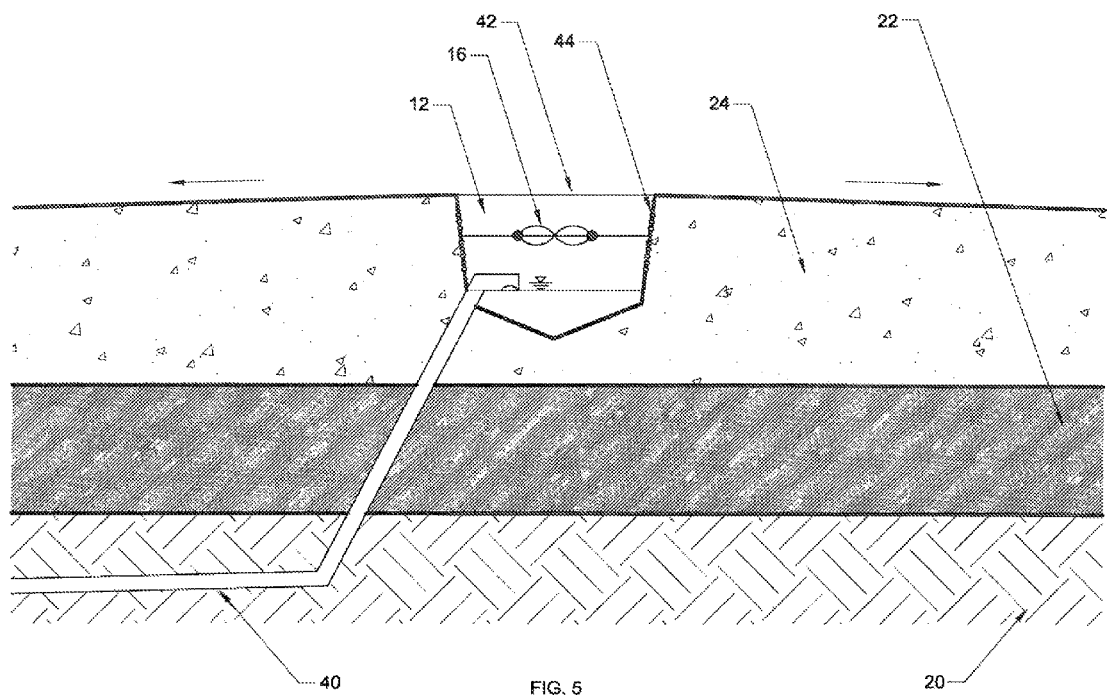
FIGS. 5 and 6 illustrate detailed cross-sections of roadways according to exemplary embodiments of the present invention.
Figure 6:
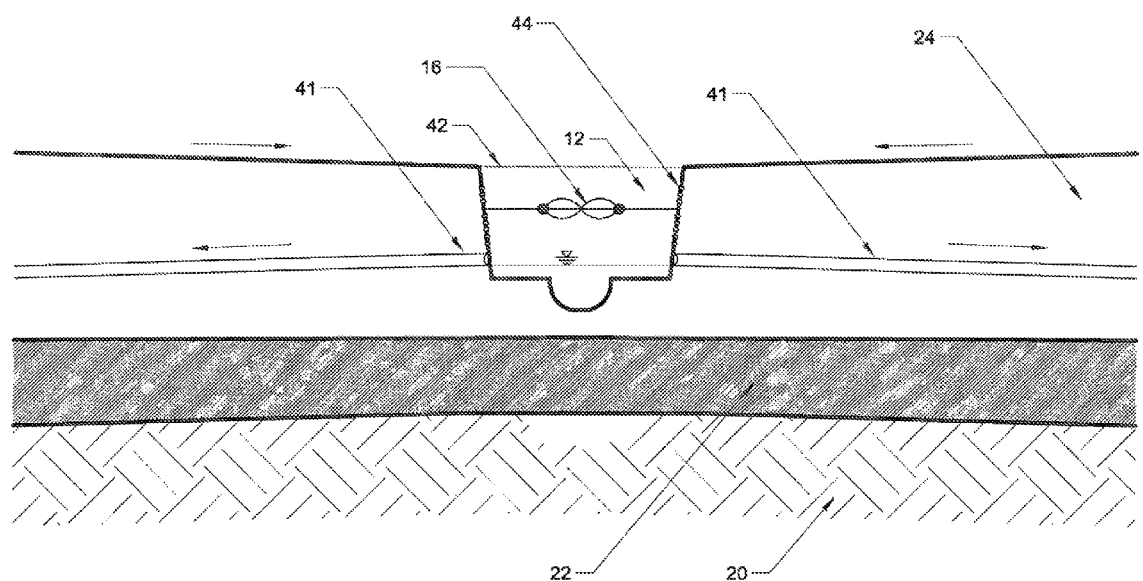
Figure 7:
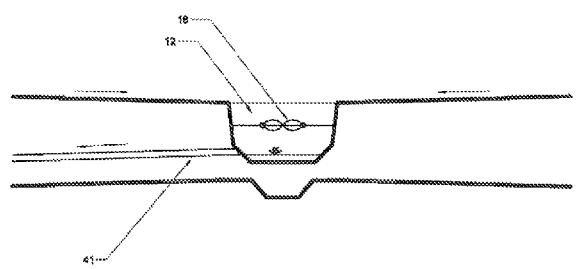
FIGS. 7-17 illustrate exemplary configurations of a trench according to exemplary embodiments of the present invention.
Figure 8:
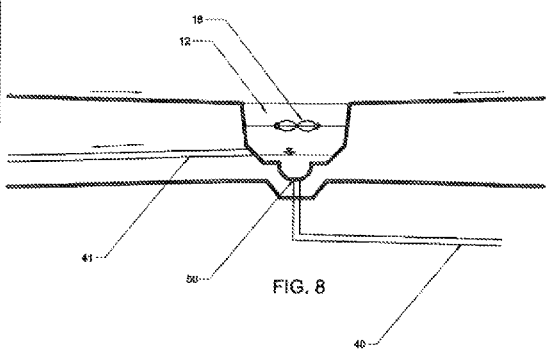
Figure 9:
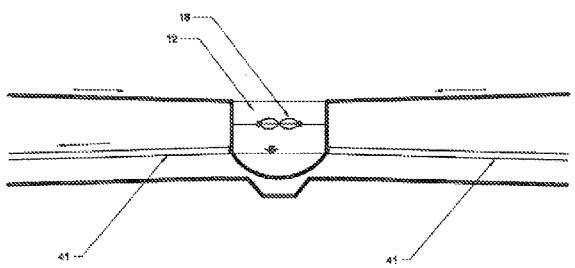
Figure 10:
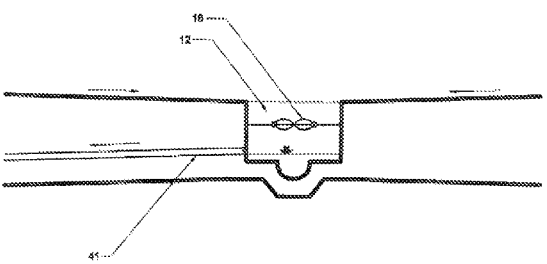
Figure 11:
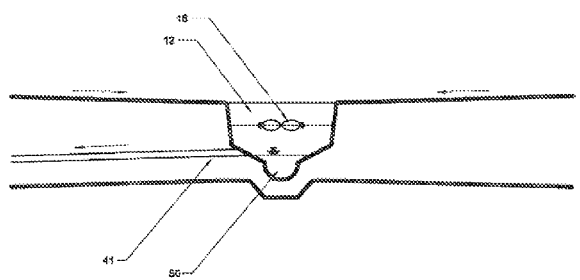
Figure 12:
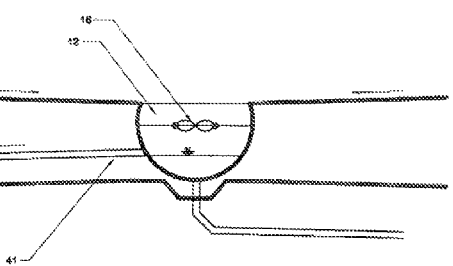
Figure 13:
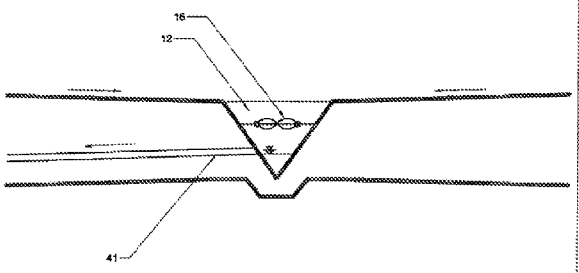
Figure 14:
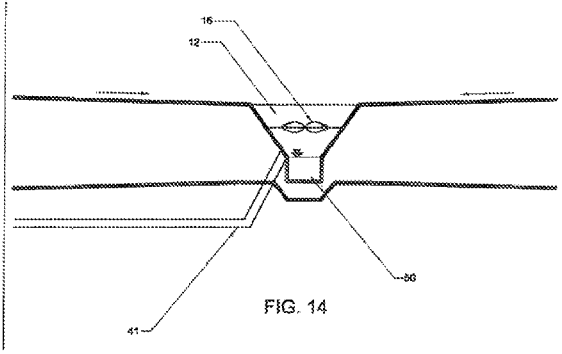
Figure 15:
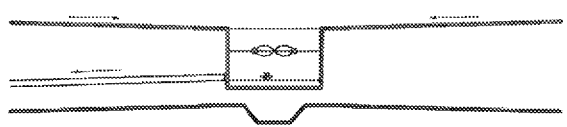
Figure 16:
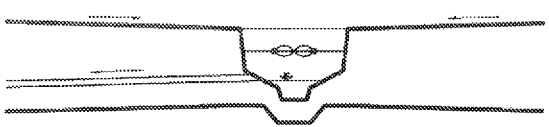
Figure 17:
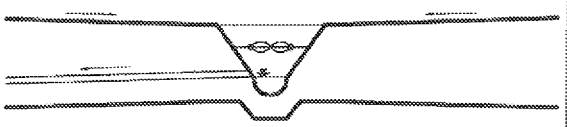

As shown in FIG. 4 and FIGS. 5-6, an exemplary roadway 10 includes a highly compacted subsurface 20 or sub-base as the lowest layer of the roadway 10. An aggregate or granular base 22 is then rolled and compacted on top of the subsurface 20. The depth of the aggregate base 22 and the composition and size of the aggregate is appropriately determined according to the desired use of the roadway 10. Finally, a roadway surface layer 24 is formed on top of the aggregate base 22. The roadway surface layer 24 is preferably constructed of concrete or asphalt in accordance with known methods. The trench 12 or trench section 13 is preferably formed entirely within the roadway surface layer 24, although in some embodiments the trench may be formed to extend into the compacted aggregate base 22 or subsurface 20 depending on the depth of the roadway and the depth of the trench. As further discussed below, depending on the chosen roadway surface material and use of the roadway, the trench 12 may be formed during the setting of the roadway surface 24 using a custom removable form placed at a desired depth in the surface layer 24 around which the surface layer is constructed. The trench 12 may also be formed using a separate structure, housing or encasement built into the roadway surface layer 24. It should be appreciated by one of ordinary skill in the art that a trench 12 can be formed according to the exemplary embodiments in a newly constructed roadway 10 or may also be retrofit into the surface of an existing roadway during a resurfacing or maintenance of the existing roadway, for example.

A trench 12 or trench section 13 according to an exemplary embodiment may be constructed according to unique requirements of the roadway 10 determined by the desired use of the roadway and the climate where the roadway is constructed. In certain climates with extreme temperature fluctuations that necessitate a specific composition of the roadway surface layer 24, the trench 12 may be formed in a manner suitable for the necessary composition of the roadway surface. For high traffic roadways or those accommodating heavy trucks or vehicles, the structure of the roadway must be strong enough to withstand the frequency of use and weight of such vehicles. Thus, trench 12 for such high traffic roadways is preferably formed with specific dimensions and materials or by a specific process that results in a very durable and strong trench 12 or trench section 13 that does not compromise the strength and durability of the roadway 10.

According to one embodiment, as referred to above, a trench 12 or trench section 13 is constructed using a custom form or forms prepared with the desired shape and dimensions of the trench 12. The dimensions of trench 12 or trench section 13 may vary according to climate, environment, road use or proposed utility. The width, depth and location of trench 12 or trench section 13 in the roadway 10 is preferably optimized to effectively capture the generated wind flow to the wind turbines 16 positioned inside the trench 12. As discussed further below, the depth and other dimensions of the trench 12 or trench section 13 may be optimally selected in consideration of the planned use of the roadway and the environmental impact on the roadway 10 as well as the planned implementation of the wind turbine 16 inside the trench. Once the compacted sub base 20 and compacted aggregate or granular base 22 are formed and settled, the roadway surface materials are prepared for the roadway surface layer 24. The roadway surface layer 24 may include any additional reinforcement means or materials as is customarily used in constructing such roadways, such as reinforcing steel or wire mesh.

Prior to pouring or forming the roadway surface layer 24, a custom form or forms is prepared according to any suitable shape and dimension, such as, but not limited to, those shown in FIGS. 7-17. The custom form is then positioned and secured in a suitable manner, such as using an anchor or anchors, in the planned roadway where the trench 12 or trench section 13 is to be formed. The roadway surface materials, typically an asphalt or concrete mix, are poured or formed onto the compacted granular base 22 surrounding the custom form. Once the roadway surface layer 24 cures, the trench 12 or trench section 13 is created. After curing of the roadway, the custom form or forms are then removed and may be re-used. A form according to an exemplary embodiment may be composed of any suitable material and is preferably constructed to be easily removable from the cured surface layer 24.

According to another embodiment, trench 12 or trench section 13 may be constructed using a pre-formed or pre-cast structure, encasement or any other structural membrane or casing not limited to steel, cast iron, polymer concrete, pvc, fiberglass, carbon fiber or any type of material suitable for the trench 12 or trench section 13. Additionally, in some embodiments, the encasement or membrane is preferably treated to be resistant to corrosion or other structural weakness attributable to environmental elements and effects. For example, the encasement or other membrane may be treated using a water-proofing paint, solution or other material. The encasement may also be treated to reduce surface fraction between the encasement surfaces and the high speed wind entering the encasement generated by the passing vehicles above. The encasement shall be constructed to be durable and to provide additional support for the roadway surface layer 24 and trench 12 or trench section 13 so as to prevent the roadway surface from caving into the trench area. The encasement is also formed to withstand the compressive forces generated as a result of thermal fluctuations of the expanding concrete or asphalt used in the surface layer. In one embodiment, the encasement includes an additional reinforcement means such as a support beam or beams dispersed along the length of the encasement. The support beams is preferably secured between the sidewalls of the encasement to prevent an inward collapse of the encasement on itself.

The encasement provides an outline of the trench 12 in the roadway surface layer 24 while also housing the necessary components for harnessing the displaced wind energy and converting the wind energy to usable electric power. The encasement is preferably formed in a shape and size that provides the above benefits, such as any one of the shapes shown in FIGS. 7-17, while sufficiently housing the necessary wind energy harnessing technology of the exemplary embodiments, as described further below. Similar to the above embodiment, once the encasement or structural membrane is placed and secured in the desired location of the planned roadway 10, the roadway surface layer 24 is then formed around the encasement with concrete or asphalt or any composition suitable for the roadway surface layer 24, as is implemented in the art.

Figure 18:
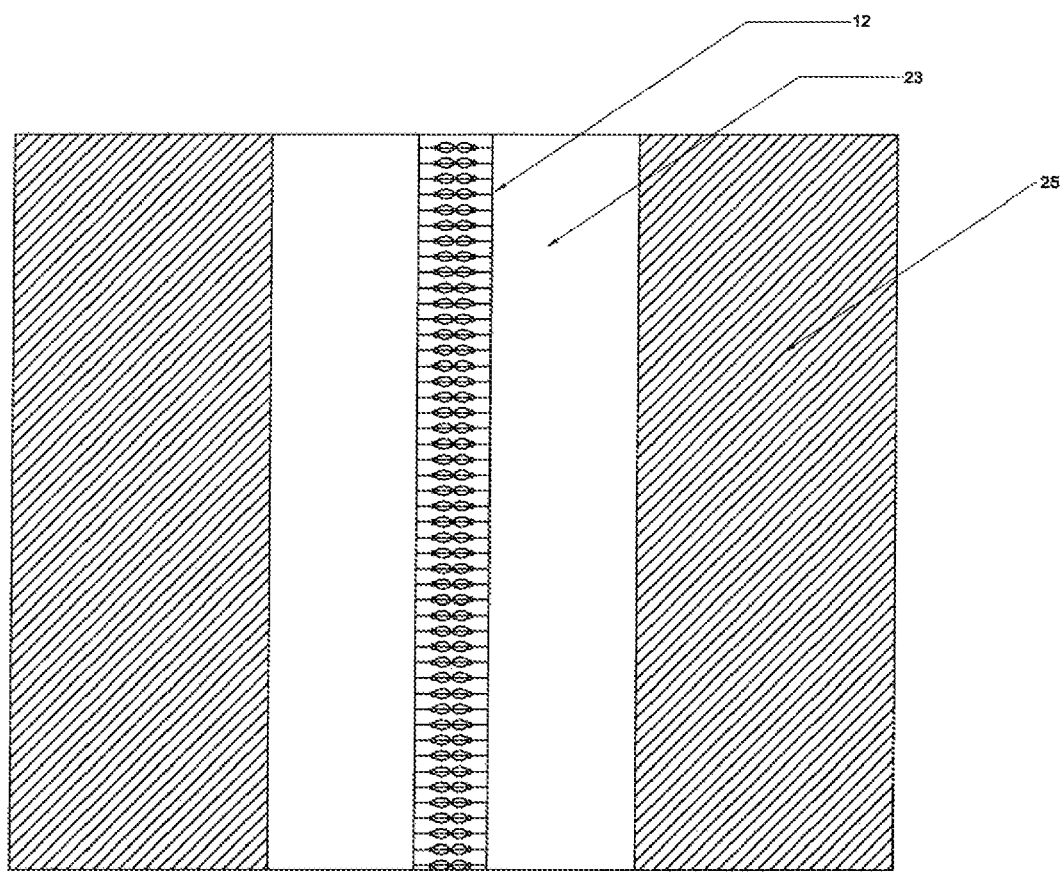
FIG. 18 illustrates a roadway surface according to an exemplary embodiment of the present invention.

According to one embodiment, such as that shown in FIG. 18, the roadway surface may be composed of more than one material. For example, the roadway surface 24 may include a first section 23 of a first composition immediately surrounding the inlayed trench 12 and a second section 25 of a second, different composition. In some embodiments, the first section 23 includes a concrete surface whereas the second section includes an asphalt surface. Concrete is typically more expensive than asphalt, thus in some environments it is unreasonable or unnecessary to construct the entire road surface out of concrete. Concrete, however, provides a stronger and more stable surface to support a trench 12 of the exemplary embodiments. Thus, concrete is preferably utilized in the reduced area of the first section immediately surrounding the inlayed trench 12, whereas the less expensive asphalt composition is utilized in the larger remaining surface area of the second section 25.

Because the built-in trench 12 or trench section 13 is an open area provided in the roadway 10, specialized roadway drainage methods should be utilized, as shown in FIGS. 5 and 6. Rainwater and other debris will inevitably enter the open trench 12 or trench section 13 provided in the roadway 10, so it is desired to prevent the rainwater from pooling in the trench 12 and thus affecting operation of the plurality of wind turbines 16 housed within the trench. In some embodiments, the trench 12 may be formed with a bottom that includes a gradual slope feeding an outlet connection such as a drainage pipe 40. As shown in FIG. 3a, a drainage pipe or similar structure 40 is provided for draining any pooled or collected rainwater in the open trench 12. According to this embodiment, excess rainwater is prevented from entering the trench 12 by forming the roadway surface layer 24, or combined surface layer 23 and 25 as discussed above, with a surface grade "pitching out" or away from the trench 12, as shown in FIG. 5, such that the rainwater runs off to the side of the roadway 10. According to another embodiment, as shown in FIG. 6, rainwater is collected into the open trench 12 by forming the roadway surface layer 24 with a surface grade "pitching in" or toward the trench 12. The excess rainwater is then drained from the trench 12 using one or more drainage pipes or similar structures 41. There are several different configurations of drainage pipes 40 and 41, as shown in FIGS. 7-17, that are suitable for the exemplary embodiments. Additionally, any other drainage method known in the art may be incorporated in the exemplary embodiments. The desired pipe configurations of the exemplary embodiments may be determined based on the use of the roadway as well as the existing sewage infrastructure, as discussed further below. On multi-lane roadways, it is desirable to have a variation or a combination of these two drainage systems. For example, as shown in FIG. 4, an additional drain or drainage area 26 may be provided between passable lanes to drain excess rainwater run-off from each lane. Such a drain may be similar to the trench drains known in the art, as described above.

Drainage area 26 and drainage pipes 40 and 41 are preferably utilized in a well known manner according to local, state or federal regulations for draining the roadway 10. In some embodiments the drainage area 26 and drainage pipes 40, 41 are interconnected with the local sewage system of the surrounding area. In other embodiments, the drainage pipes direct the collected rainwater and other debris to a sump area or retention pond near the roadway. The trench 12 may include one or more screens within the trench to filter certain debris from entering and clogging the drainage area 26 and drainage pipes 40, 41. In some embodiments, the drainage pipes 40 and 41 may themselves include one or more specialized filters to separate the rainwater and other debris downstream from the roadway prior to entering the designated retention pond or sewage system. For example, any oil and grease collected in the draining pipes 40 and 41 may be separated from the rainwater prior to entering the retention area or sewage system. The separated components may then be directed to a suitable area of the sewage system or retention pond. The drainage system of the roadway 10 in the exemplary embodiments shall comply with any specifications set by private, local and/or federal agencies and shall be able to handle forecasted rainfall or precipitation and the 100, 50 and 10 year specifications such agencies set for drainage systems.

A trench 12 or trench section 13 according to the exemplary embodiments preferably includes a grate 42 or grate-like structure to protect the wind turbines or wind generators 16 from vehicles passing overhead, as well as other debris. Additionally, grate 42 is preferably configured to effectively direct the displaced wind energy generated by passing vehicles into the trench 12 or trench section 13. It is also desired to provide a grate 42 that is positioned relatively flush with the roadway surface 24 so as to provide a smooth roadway surface and to minimize the impact of the trench on the desired use of the roadway. In the exemplary embodiments, grate 42 is configured such that it cannot be lifted or removed from the trench area in any event other than construction or maintenance of the system. Grate 42 is configured to be safe for the passage of standard vehicles and motorcycles to cross over or ride on. Additionally, the grate 42 must be durable so as to withstand the forces imparted by passing vehicles and other environmental effects.

Figure 19:
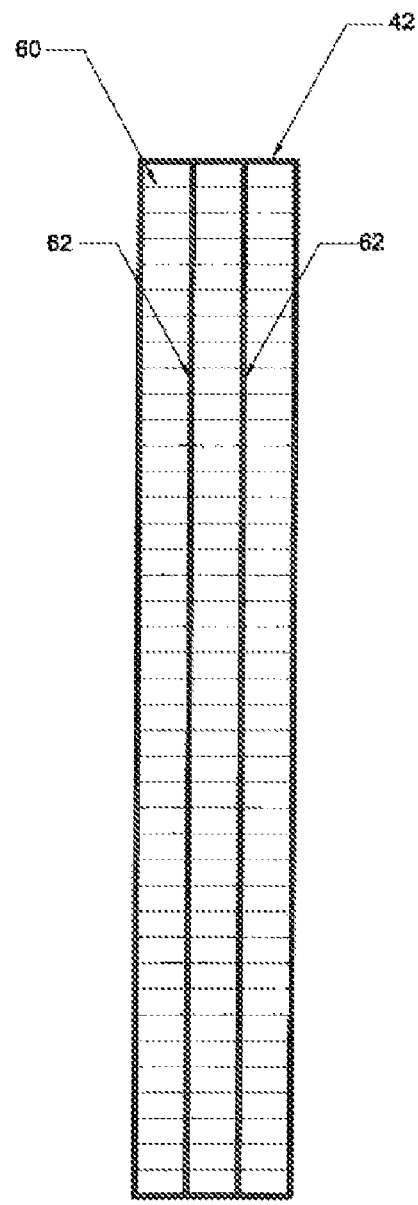
FIG. 19 illustrates a grate provided on a trench according to an exemplary embodiment of the present invention.

Grate 42, as shown in FIG. 19, preferably includes a plurality of metal or hardened horizontal slats 60 oriented at an optimal angle to direct the generated wind energy into the open area of the trench 12 housing the plurality of wind turbines 16. The optimum angle may be determined for the planned use of the roadway, and may range from 30 to 45 degrees in some embodiments. The horizontal slats 60 may be welded or similarly affixed to a grate 42 or otherwise built into the surface of the roadway 10. The number of hardened horizontal slats 60 and the distance separating each shall be optimally determined according to the thickness of the slats 60 and the type of material utilized, as well as in consideration of the planned use of the roadway. Grate 42 also preferably includes one of more metal or hardened vertical slats 62 for reinforcing the strength and durability of the grate 42. The vertical slats 62 may be anchored to the trench encasement and may be positioned underneath the horizontal slats or welded thereto.

Where appropriate, grate 42 is preferably configured as part of the pre-formed encasement forming the trench 12 or trench section 13. In other embodiments, grate 42 may be secured into the surface layer of the roadway and provided substantially flush with the roadway surface. In some embodiments, the grate may be affixed to the formed trench or trench encasement using a rail on which the grate is anchored. Such a rail system serves to increase the durability of the trench and prevent failure due to constant forces of the vehicles passing overhead. In some embodiments, grate 42 is preferably configured with a gate or latch or other similar accessible structures to allow the wind turbines 16 to be accessed by authorized personnel for maintenance of the wind turbines 16 and maintenance of the trench 12 or trench section 13, as discussed further below.

Trench 12 or trench section 13 is preferably configured to enable effective functioning of the wind turbines 16 while minimizing necessary maintenance. The dimensions and shape of the trench 12 or trench section 13 may be selected from one of the configurations shown in FIGS. 7-17, although the exemplary embodiments are not limited to the specific configurations shown. Each of the depicted configurations may provide an advantage over the others, and the specific configuration should be chosen in consideration of the environmental impact on the open trench 12 or trench section 13. For example, in climates where considerable rainfall or debris from falling leaves, snow, dirt etc. is expected to enter the open trench 12 or trench section 13, the trench may configured with a designated sump area 50, as shown in FIGS. 8, 10, 11, 14, and 17. The sump area 50 can then be monitored for excessive build up and when necessary, the sump area may be cleared through a high pressure water system or by vacuum. Additionally, in the embodiments where grate 42 enables access to the trench 12 or trench section 13, the sump area 50 may be manually cleared during routine maintenance of the system. In some embodiments, the sump area 50 is configured below the drainage pipes 40, 41 so as to prevent blockage of the drainage pipe by excess build up in the sump area 50. In other embodiments, such as that shown in FIGS. 9 and 12, for example, the trench is configured with an extended depth that functions similar to the sump area 50. The depth of the trench 12 or trench section 13 in each of the exemplary embodiments may be determined based on the amount of precipitation or unwanted debris that is expected to enter the open trench 12 or trench section 13.

In some climates where snow, ice or freezing rain is commonplace and may negatively impact operation of the wind turbines 16 of the exemplary embodiments, special care may be taken to minimize such effects. In some embodiments, a heating system or heating coils 44 may be utilized, as shown in FIGS. 5 and 6. The heating coils 44 of an exemplary embodiment may be resistive coils that generate heat when applied with an electric current, as are commonly used in known prior art. The electric current may be supplied from a storage element provided within the trench 12 that stores electricity previously generated by the wind turbines 16. Other heating systems known in the art may also be implemented in the exemplary embodiments for achieving the desired purpose. The heating coils 44 are preferably configured to melt any snow or ice that may accumulate on top of the grate 42 and inside the trench 12 or trench section 13. The type of heating system may be determined according to annual snow records and average temperatures of the particular climate where the exemplary embodiments are utilized.

Figure 20:
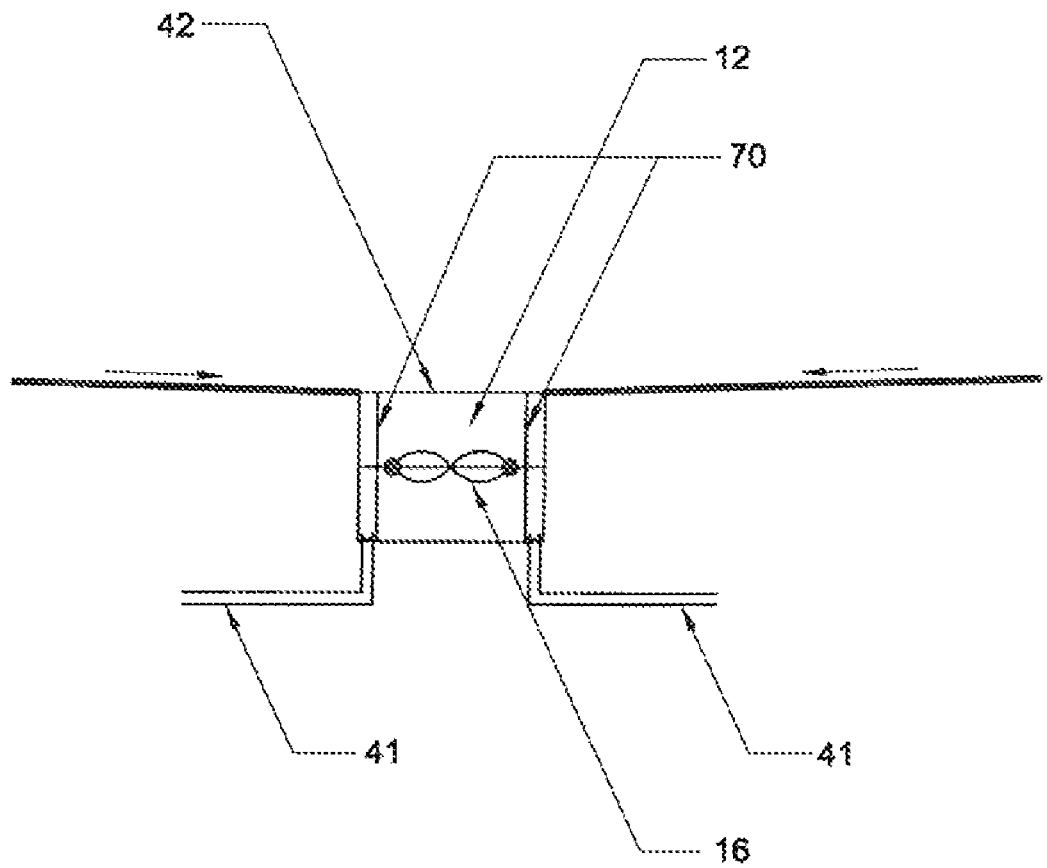
FIGS. 20, 21 and 22 illustrate additional exemplary embodiments of a trench system according to the present invention.
Figure 21:
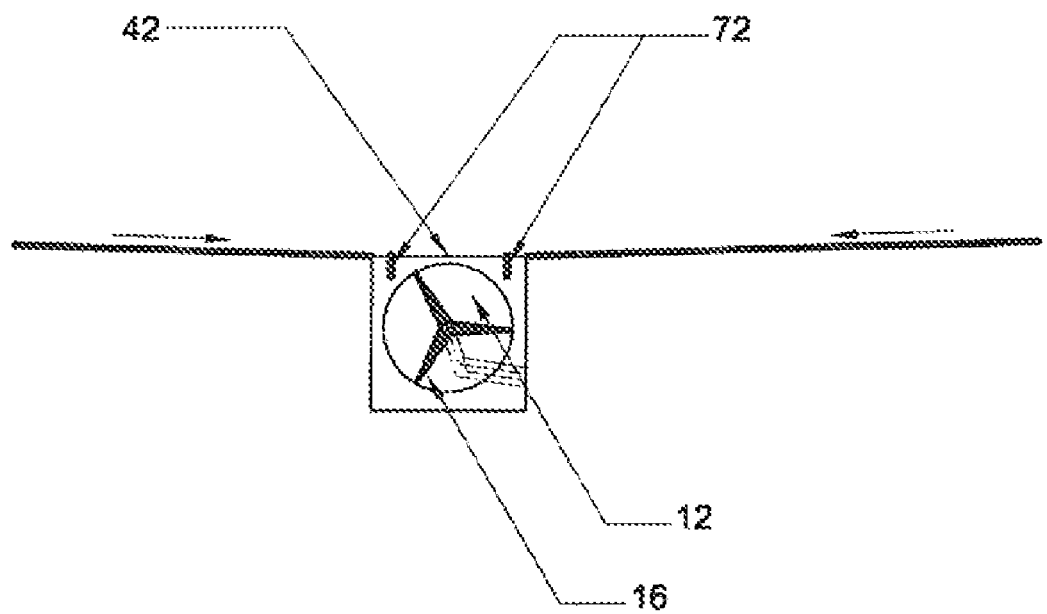

In one embodiment, as shown in FIG. 20, the trench 12 or trench section 13, may include internal walls or partitions 70 that are configured to divert and separate precipitation and debris to the periphery of the trench 12 so that such precipitation and debris does not directly contact the wind turbines or wind generators 16 provided within the trench 12. In another embodiment, as shown in FIG. 21, grate 42 provided on the trench 12, may include protective ears 72 or other similar features for diverting and changing the direction of storm water, precipitation or other debris entering the open trench 12. In the exemplary embodiments, the protective ears 72 may be used alone or in combination with the partitions 70. In each embodiment, the wind turbines or wind generators 16 provided in the trench directly experience less of the precipitation and debris entering the trench. The negative effects of such entering precipitation are thus minimized with respect to the functionality of the wind turbines 16, while also improving the durability of the wind turbines 16.

The exemplary embodiments are not limited to a specific type of wind turbine or wind generator 16 and may utilize off-the shelf components readily available. However, in a preferred embodiment, the wind turbines or wind generators 16 may be vertical axis wind turbines, as shown in FIGS. 5 and 6, that are positioned horizontally inside trench 12 or trench section 13 such that the axis of rotation of the wind turbines 16 is perpendicular to the direction of wind flow entering the trench. Such examples of known vertical axis wind turbines include the Darrieus wind turbine, the Savonius wind turbine and a Giromill. Any one of these types of wind turbines, or combinations or modifications of these wind turbines may be implemented in the exemplary embodiments. The wind turbines 16 are configured to be of a size and dimension such that they may be placed and secured in a trench 12 of desirable width. The wind turbines 16 are preferably attached or anchored to at least one side wall of the formed trench 12 or encasement using any suitable method for providing a stable configuration. As discussed further below, the wind turbines or wind generators 16, according to the exemplary embodiments, are preferably selected and oriented such that the air flow entering the open area of trench 12 is effectively captured by the wind turbines resulting in efficient and effective generation of power from the experienced wind energy. The exemplary embodiments may utilize a specific blade design, configuration, and material construction in consideration of the wind energy expected to enter the trench 12 as well as the particular climate where the exemplary embodiments are deployed. The design of the wind turbines 16 is preferably selected to enable a plurality of wind turbines 16 to be closely spaced within the trench 12 or trench section 13 and to maximize the electricity generated from the experienced wind energy inside the trench. In the exemplary embodiments, each wind turbine 16 may be attached to its own generator or may share a generator with one or more other wind turbines 16.

Figure 22:
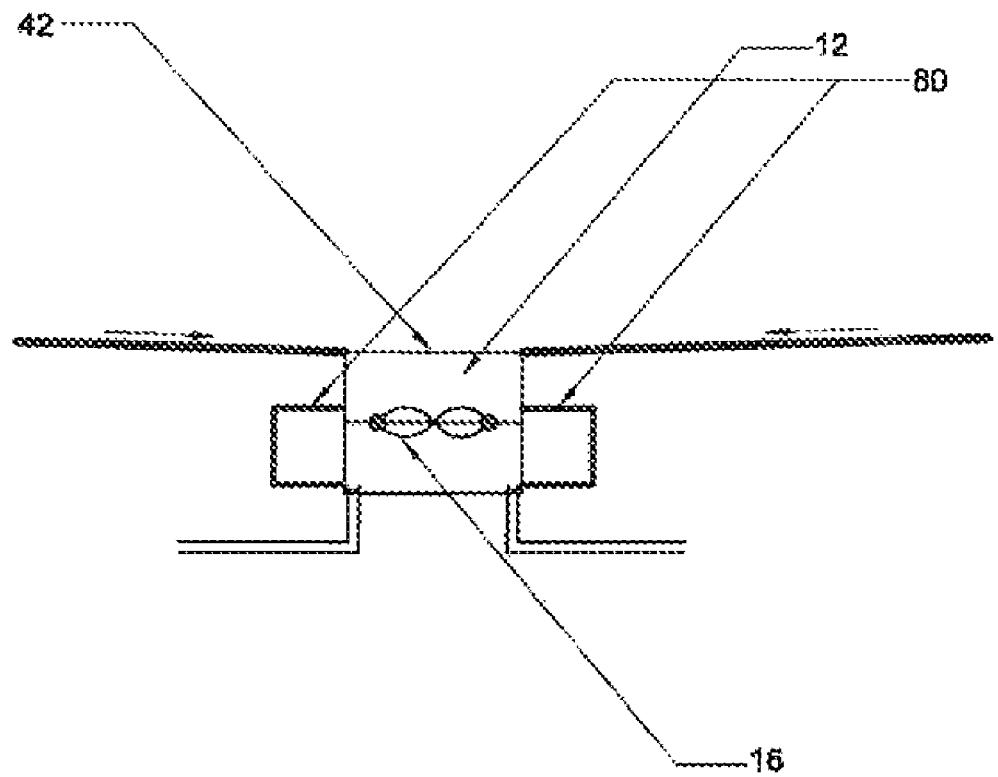

As discussed above, trench 12 or trench section 13 is preferably configured to house a wind turbine or wind generator 16 of a desired configuration and any other components necessary for generating electric power from the mechanical energy of the rotating wind turbine 16. For example, in some embodiments, the trench 12 or trench section 13 is configured to house the wind turbine or wind generator 16 as well as any batteries for storing the generated electric power, power inverters, charge controllers, other controllers, cables and other electronics or devices as deemed necessary. The wind turbines or wind generators 16 may be configured to supply AC or DC electric current, as desired for the specific implementation. In some embodiments, as shown in FIG. 22, the trench 12 may include built in storage space 80 configured to house any of the necessary components of the wind turbine or wind generator 16. Additionally, storage space 80 may be configured to contain additional cables, such as fiber optic, coaxial or twisted pair cables for a variety of uses as desired.

In the exemplary embodiments, it is only natural that the roadway will not be occupied at all times. There will inevitably be times when the wind turbines 16 do not experience any displaced air due to the lack of vehicles passing overhead. It is a common challenge in the art to efficiently utilize wind turbine during a period of decreased wind from the sparse traffic. A completely still wind turbine requires a greater initial force to effect than is needed to maintain rotation with persistent wind energy. As such, to efficiently harness the displaced wind generated by the occasional vehicle, some of the harvested electric power is provided to the wind turbine to maintain at least a minimal rotation of the blades of a wind turbine 16 during these times. In this embodiment, the displaced wind energy generated by the intermittent vehicle is more efficiently harnessed by the wind turbines 16.

Figure 23:
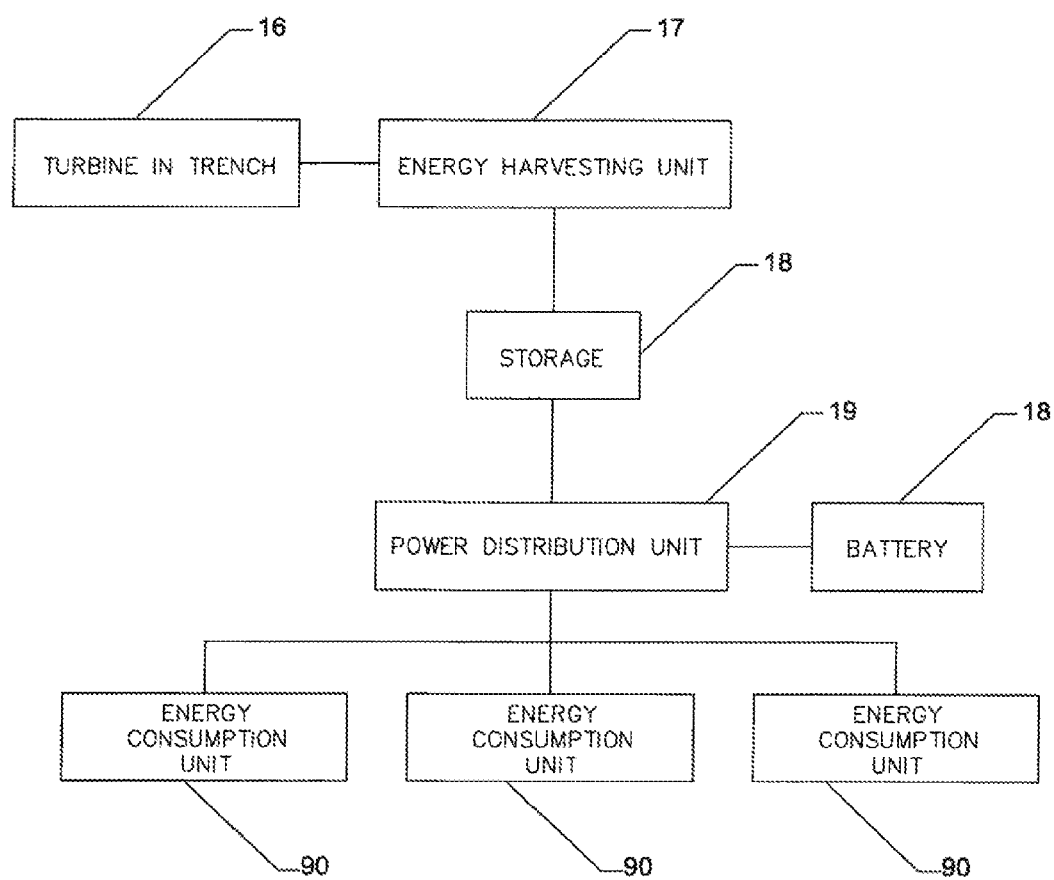
FIG. 23 is a block diagram illustrating an exemplary wind energy harnessing system according to the exemplary embodiments.

As shown in FIG. 23, the exemplary embodiments include a wind turbine or wind generator 16 provided in the trench to convert mechanical energy of the rotating wind turbine into electric power. In the exemplary embodiment, the wind turbine may be configured to generate the electric power. Alternatively, a separate generator or energy harvesting unit 17 may be provided to convert the mechanical energy into electric power. The electric power generated from the mechanical energy may be stored by a storage device 18 provided within the trench 12 or trench section 13 and may also be provided to a power distribution unit 19 via a transmission medium 15. Power distribution unit 19 is preferably configured to distribute the generated electricity to a power grid or directly supply power to any number of energy consumption units 90. In some embodiments, the power distribution unit 19 is further configured with an additional storage unit 18 for storing some of the generated electricity received through transmission medium 15.

In view of the above, the exemplary embodiments provide efficient wind harnessing systems and methods for capturing the wind energy produced by vehicles passing over a roadway surface and converting such wind energy into useable power. As such, the exemplary embodiments function to effectively generate increased amounts of power due to the increased wind energy experienced in such close proximity to the vehicles passing overhead. Accordingly, greater amounts of power can be supplied using clean, renewable energy sources, thus decreasing the dependence on other greenhouse gas emitting processes that are implemented to meet energy needs.

The above-described embodiments of an apparatus and method for harnessing the wind energy generated by vehicles passing on a roadway and converting such harnessed wind energy into useful power have been shown and described with reference to particular illustrative embodiments. The present invention is not to be restricted by the exemplary embodiments but only by the appended claims and their equivalents. Other embodiments will be apparent to those of ordinary skill in the art from consideration of the above exemplary embodiments, without departing from and the scope and spirit of the present invention indicated by the following claims.

What is claimed is:

1. A wind energy harnessing system comprising:
   a surface provided as part of a roadway passable by a vehicle, said surface including an open area extending below the surface, wherein said open area forms a cavity and wherein said open area includes an elongate portion extending parallel to a direction of travel of the vehicle and positioned substantially in the middle of a passable area of the roadway;
   a grate positioned over said open area and substantially flush with said surface; and
   a wind energy harnessing apparatus positioned within said cavity.

2. The system of claim 1, wherein said elongate portion forms a trench-like cavity.

3. The system of claim 2, wherein a plurality of wind energy harnessing apparatuses are positioned along the direction of travel within said cavity.

4. The system of claim 1, wherein said surface includes a plurality of open areas forming a plurality of distinct cavities, each housing at least one wind energy harnessing apparatus.

5. The system of claim 1, further comprising:
   a power generating unit configured to convert wind energy harnessed by the wind energy harnessing apparatus into usable power.

6. The system of claim 1, wherein said grate further comprises a plurality of slats extending across said open area, said slats oriented at an angle toward said cavity.

7. The system of claim 1, wherein said cavity includes a first sidewall and a second sidewall, and said wind energy harnessing apparatus is affixed to at least one of the first and second sidewalls.

8. The system of claim 7, wherein said first and second sidewalls define a first area within said cavity housing the wind energy harnessing apparatus, and at least one bottom wall defines a second area within said cavity.

9. The system of claim 8, wherein said cavity includes an outlet connected to a drainage pipe provided below said surface.

10. The system of claim 7, wherein said cavity includes at least one additional wall positioned inside said cavity spaced a distance from said first or second sidewall.

11. The system of claim 7, wherein said at least a portion of one of the first and second sidewalls is configured to define a third area within said cavity.

12. The system of claim 1, further comprising a heating element positioned within said cavity.

13. The system of claim 2, wherein said roadway comprises a plurality of layers, and said cavity is formed substantially entirely within a top layer of the roadway.

14. A method of forming a wind energy harnessing system, said method comprising:
   forming an open cavity configured to extend below a surface provided for passage of a vehicle;
   positioning a wind energy harnessing apparatus within said cavity; and
   securing a grate over said cavity, said grate being substantially flush with said surface and being configured to include a plurality of slats extending across said open area, said slats oriented at an angle toward said cavity.

15. The method of claim 14, wherein said forming further comprises positioning a pre-formed structure to extend below the surface, said structure forming the open cavity.

16. The method of claim 14, wherein said forming further comprises forming the open cavity to include an elongate portion extending parallel to a direction of travel of a vehicle passing over the surface.

17. The method of claim 16, further comprising positioning said open cavity below the surface such that a passing vehicle passes over said open cavity.

18. The method of claim 14, wherein said forming further comprises forming the open cavity to include an elongate portion extending perpendicular to a direction of travel of a vehicle passing over the surface.

19. A method of harnessing wind energy, said method comprising:
   receiving in an open cavity configured to extend below a surface provided for passage of a vehicle, wind energy generated by a vehicle passing on or over said surface;
   harnessing said wind energy via a wind energy harnessing apparatus; and
   converting said harnessed wind energy into usable power;
   wherein said cavity is covered by a grate comprising a plurality of slats extending across said cavity configured to direct the wind energy into said cavity.

20. The method of claim 19, wherein said cavity includes an elongate portion forming a trench-like cavity.

* * * * *